Figure 4:
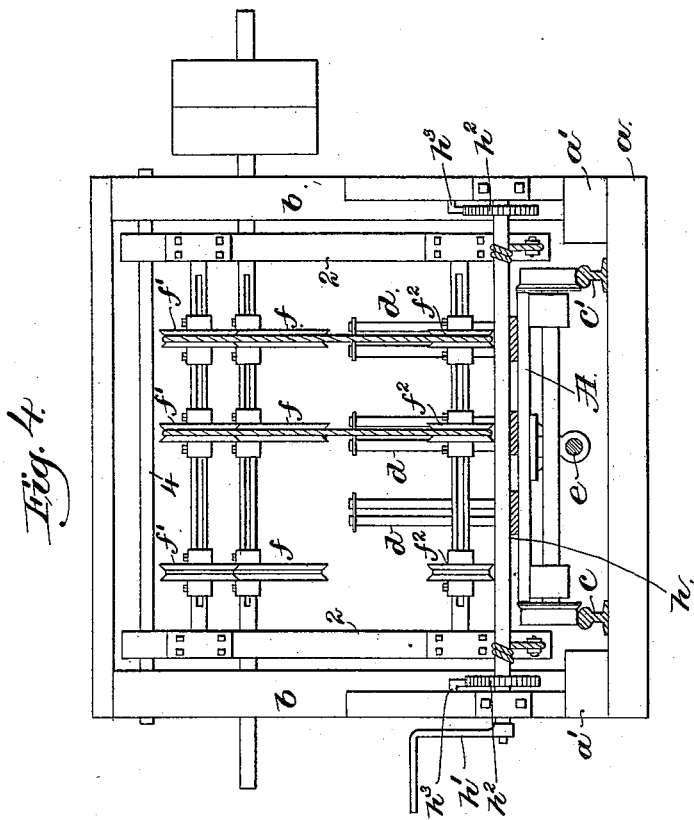

(No Model.) 2 Sheets—Sheet 1.
T. SHEA, J. L. WOODBURY & F. A. WHIPPLE.
STONE CUTTING MACHINE.
No. 511,715. Patented Dec. 26, 1893.
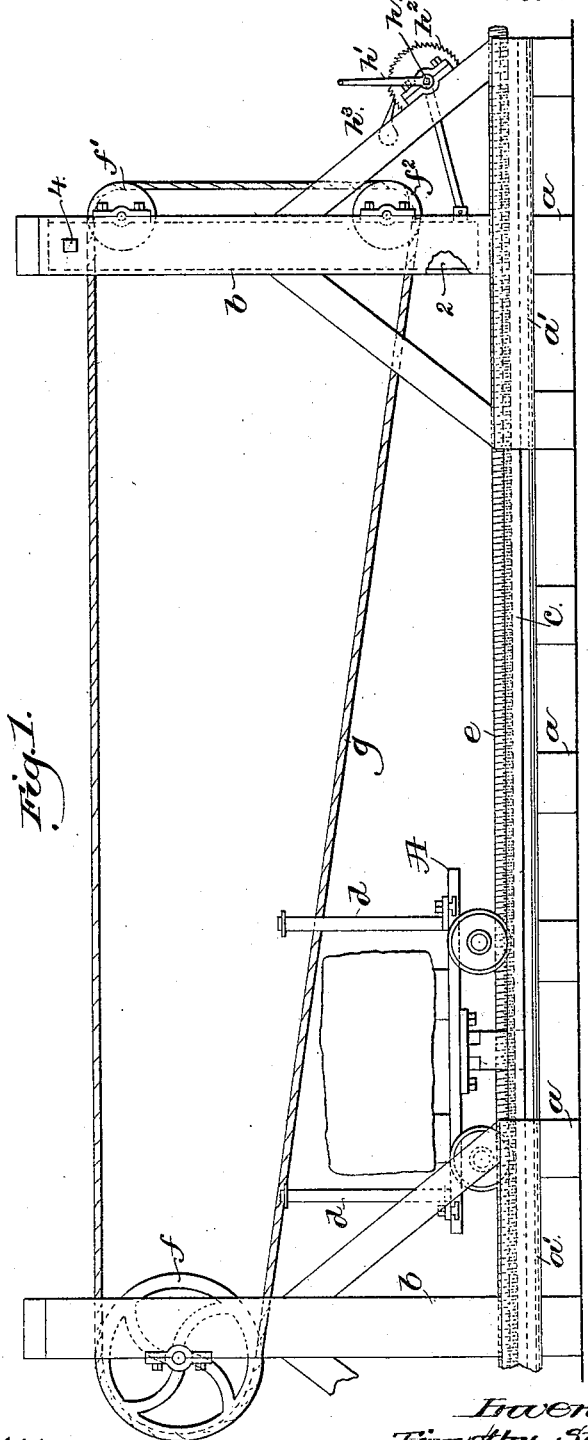

(No Model.) 2 Sheets—Sheet 2.

T. SHEA, J. L. WOODBURY & F. A. WHIPPLE.
STONE CUTTING MACHINE.

No. 511,715. Patented Dec. 26, 1893.

Witnesses.
Edward F. Allen.
Fred S. Greenleaf.

Inventors.
Timothy Shea
Joseph L. Woodbury
Frank A. Whipple.
by Crosby & Gregory attys.

United States Patent Office.

TIMOTHY SHEA, JOSEPH L. WOODBURY, AND FRANK A. WHIPPLE, OF MILFORD, MASSACHUSETTS.

STONE-CUTTING MACHINE.

SPECIFICATION forming part of Letters Patent No. 511,715, dated December 26, 1893.

Application filed March 6, 1891. Serial No. 383,964. (No model.)

*To all whom it may concern:*

Be it known that we, TIMOTHY SHEA, JOSEPH L. WOODBURY, and FRANK A. WHIPPLE, of Milford, county of Worcester, State of Massachusetts, have invented an Improvement in Stone-Cutting Machines, of which the following description, in connection with the accompanying drawings, is a specification, like letters and figures on the drawings representing like parts.

This invention has for its object to improve the construction of stone-cutting or sawing machines it being especially designed for cutting or sawing stone into slabs or other pieces.

In accordance with this invention, an endless stone cutting band is moved continuously by suitable pulleys over which it passes, one portion of said band running in an inclined plane, and the stone to be cut is carried on a suitable horizontally movable truck beneath said continuously moving band so that the said inclined portion thereof will act on the stone and cut it as it is moved forward. Suitable means are provided for varying the tension of the band and also suitable means are provided for moving the truck which carries the stone forward.

Figure 1 shows in side elevation a stone cutting machine embodying this invention; Figs. 2 and 3 details of different kinds of stone cutting bands which may be employed, and Fig. 4 a right hand end view of the machine shown in Fig. 1.

The main frame comprises a suitable base composed of transverse beams $a$, upon which rest longitudinal beams $a'$, and to each end of said longitudinal beams suitable upright posts $b$ are erected. Two parallel rails $c, c'$ are placed longitudinally on said transverse beams $a$, which constitute a track on which the truck A runs, said truck having suitable wheels as shown. The stone to be cut is placed on said truck A and guides $d, d$, are provided at each end of the truck as shown. Beneath the truck a screw rod $e$, is located, and on the under side of the truck a bracket or hanger is fixed which has an internally screw-threaded portion which receives the screw rod $e$. As the screw rod $e$ is turned by any suitable means not shown, the truck is moved slowly forward and backward at will.

The stone cutting band is herein represented as an endless band passing over the pulley $f$, at one end of the apparatus which pulley has its bearings in the posts or uprights $b, b$, and over two smaller pulleys $f', f^2$ at the other end of the apparatus which pulleys have their bearings in a frame herein shown as composed of two side bars 2, 2, arranged to be moved on a supporting rod 4, having its bearings in the uprights $b, b$, at or near their upper ends. The pulley $f^2$ is located below the plane of the pulley $f$ so that the endless band presents a diagonal or inclined portion $g$ from end to end of the apparatus while the pulley $f'$ may be in the same plane with the pulley $f$ that the band may move from one to the other pulley $f, f'$ in a horizontal plane. The shaft $h$ has its bearings in the stationary end frame, to which shaft is secured a crank arm $h'$ by which it may be revolved, and on said shaft a suitable ratchet wheel $h^2$ is fixed which is engaged by a pawl $h^3$ to prevent backward rotation of the shaft. Suitable cords or chains are attached to the lower end of the frame 2, 2, which are wound on the shaft $h$. By turning the shaft $h$, it will be seen that the frame 2, 2, may be moved in one or the other direction to thereby vary the tension of the band. The band may be composed of several strands of wire twisted in any usual manner such as represented in Fig. 2, or it may be composed of links such as represented in Fig. 3 or otherwise as desired.

By referring to Fig. 1, it will be seen that as the stone cutting band is moved continuously the stone or stones on the truck A moved forward and presented to the inclined portion $g$ of the band are thereby cut.

As many bands may be employed as deemed necessary, three being herein shown, and said bands may be moved toward and from each other at will, by sliding the pulleys on their shafts, to thereby cut the stone into slabs of different thickness.

If found desirable, two or more trucks may be arranged on the track instead of one as herein shown.

We do not desire to limit ourselves to any particular construction shown to carry out our invention as it may be varied materially and still come within the spirit and scope of this invention.

We claim—

1. In a stone-cutting machine, an endless stone-cutting band, a pulley as $f$, a shaft supporting it mounted on a stationary framework, combined with the pulleys $f'$, $f^2$, shafts supporting them, and a pivoted frame in which said shafts are mounted, and means for moving said frame on its pivot to vary the tension of the band, substantially as described.

2. In a stone-cutting machine, an endless stone-cutting band, pulley $f$, its shaft mounted on a stationary frame-work, and pulleys $f'$, $f^2$, and shafts supporting them, and a pivoted frame supporting said shafts, and means for moving said pivoted frame to thereby vary the tension of the band, combined with a positively-driven stone-carrying truck, substantially as described.

3. In a stone-cutting machine, two or more endless stone-cutting bands, pulleys therefor, and shafts for said pulleys on which they are adjustably mounted, said bands having corresponding inclined portions as $g$, combined with a positively-driven stone-carrying truck, substantially as described.

In testimony whereof we have signed our names to this specification in the presence of two subscribing witnesses.

TIMOTHY SHEA.
JOSEPH L. WOODBURY.
FRANK A. WHIPPLE.

Witnesses:
J. E. WALKER,
A. A. TAFT.